L. PAGE.
BUNSEN BURNER.
APPLICATION FILED MAR. 28, 1913.
1,254,347.
Patented Jan. 22, 1918.
2 SHEETS—SHEET 1.
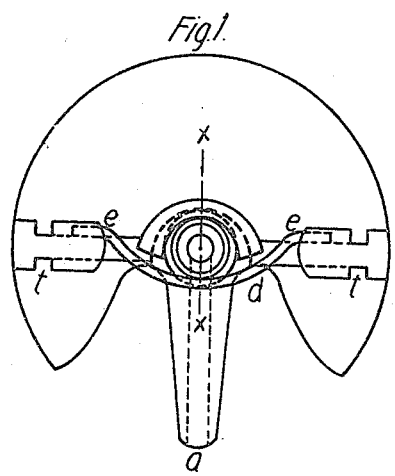
Fig.1.
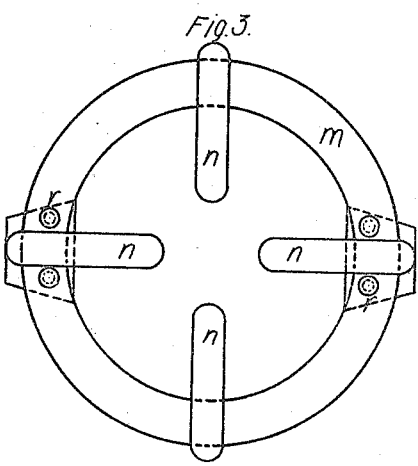
Fig.3.
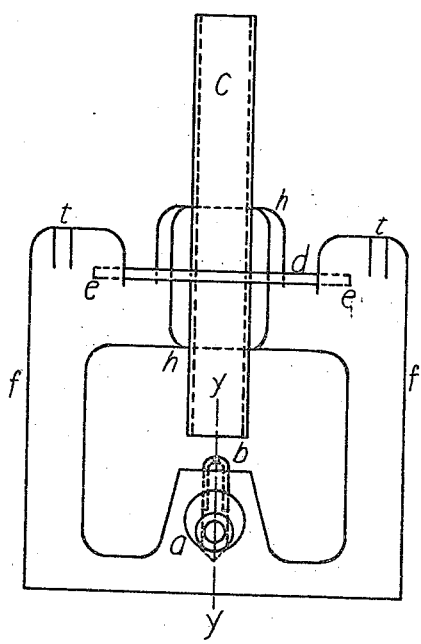
Fig.2.
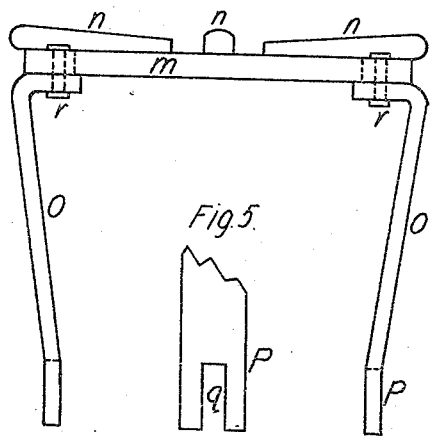
Fig.4.
Fig.5.
INVENTOR L. PAGE.
BUNSEN BURNER.
APPLICATION FILED MAR. 28, 1913.
1,254,347.
Patented Jan. 22, 1918.
2 SHEETS—SHEET 2.
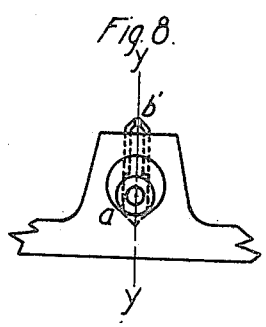
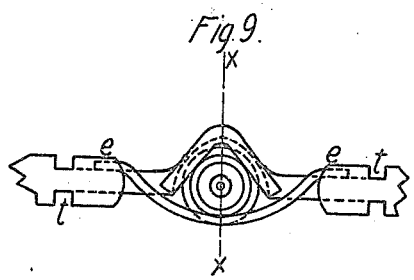
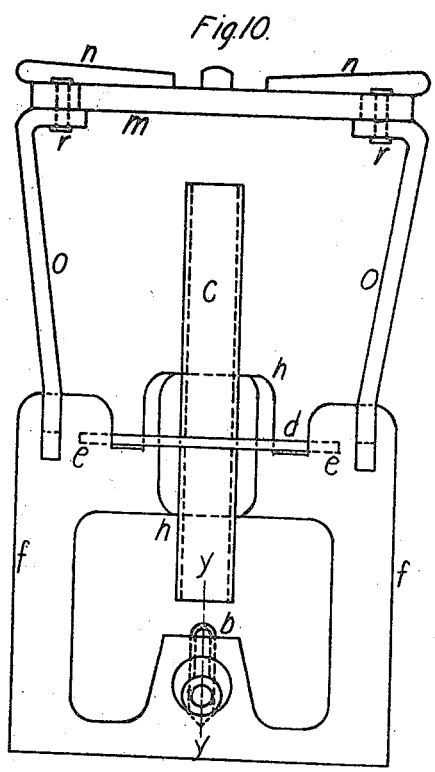
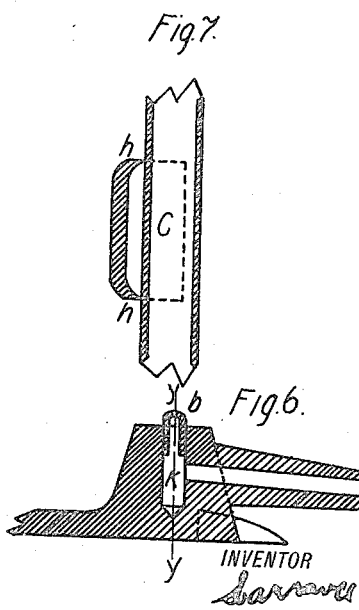
INVENTOR

UNITED STATES PATENT OFFICE.

LARRANCE PAGE, OF BERKELEY, CALIFORNIA.

BUNSEN BURNER.

1,254,347.　　　Specification of Letters Patent.　　Patented Jan. 22, 1918.

Application filed March 28, 1913. Serial No. 757,352.

*To all whom it may concern:*

Be it known that I, LARRANCE PAGE, a citizen of the United States, residing at Berkeley, in the county of Alameda and State of California, have invented a new and useful Bunsen Burner, of which the following is a specification.

My invention relates to improvements in Bunsen burners, that is to those gas burners, in which atmospheric air is mixed with the combustible gas before it is ignited. In particular my invention provides an improvement in the method of admitting the gas to the burner, an improved nipple for discharging the gas into the mixing tube, improved means for supporting the mixing tube, and an improved support for a vessel above the gas flame. These improvements are illustrated in the accompanying drawing, in which—

Figure 1 is a plan of the improved burner; Fig. 2 is an elevation of it; Fig. 3 is a plan of the vessel support removed from the burner; Fig. 4 is an elevation of the support, Fig. 5 is a partial view of one leg of the vessel support; Fig. 6 is a sectional view of part of the base of the burner, the section being taken on the line $y$—$y$ of Fig. 2; and Fig. 7 is a section of a part of the mixing tube and the device for holding it, the section being taken on the line $x$—$x$ of Fig. 1. Fig. 8 shows a modified form of the nipple with a conical top. Fig. 9 shows a modified form of the tube holder. Fig. 10 shows the burner with vessel holder in place.

Similar letters refer to similar parts in all figures.

The base of the burner is substantially circular in form but has a wide recess on one side; this recess reaches practically to the center. The base is to be made of cast iron, cast as a single piece with the admission tube, the uprights and part of the tube holding device, all described hereafter, in this specification. Immediately above the center of this recess, in the base, is the gas admission tube $a$. It is conical in external form so that different sizes of rubber tubing may be slipped over it and fit tightly. A hole is drilled through it lengthwise for the passage of the gas to be burned, and its lower surface, *i. e.* the lowest element of its conical surface, is parallel to the bottom surface of the base of the burner. To make this clear, mathematically, a cone is generated by a line, that always passes through a fixed point, moving so as to always touch a fixed circle; each one of the infinite number of positions of the line is called an element of the cone. The object of this last feature is to prevent any part of the inclosing rubber tubing from projecting below the bottom surface of the base; any such projection would cause the burner to be unsteady.

In the center of the base a hole or cavity $k$ is drilled downward from the top. This hole communicates with the hole through the admission tube so that gas may pass on its way to the nipple $b$. But this hole $k$ is much larger than is necessary for the passage of the gas; it is also drilled deeper than is necessary to communicate with the admission tube $a$, thus forming a trap; the reason for this will appear later. A nipple $b$ is inserted in the upper end of the hole $k$; this nipple has the form of an inverted, round-bottomed cup with a small perforation in the center of its bottom. This perforation allows the gas to escape into the mixing tube $c$ which is just above it. The nipple is made from thin sheet metal, by stamping or otherwise.

While I have described the nipple as being round on top where the gas outlet is, it may be conical instead of round as that form is easier to turn on a lathe. The conical form is shown in Fig. 8. In any case, the top must be shaped so as to cause a suction of the air necessary to mix with the gas. This nipple is a trifle larger than the hole $k$, and is forced in, hence no shoulder in the hole is necessary to support the nipple.

This form of construction leaves a comparatively large, empty space or cavity both within the nipple and for some distance below it, this cavity prevents clogging; should any solid or semi-solid substance enter through the perforated nipple or otherwise, it would drop into the trap at the bottom of hole $k$, where it would be out of the way of the gas. Or should it stick to the sides of the hole $k$ there would still be ample room for passage of the gas. Further any substance stopping in the perforation could be removed easily with a small wire or a toilet pin.

Rising from opposite sides of the base are two uprights $f, f$; they are usually cast in one piece with the base, but may be made of stamped sheet metal or of wire. When cast, which is the preferred form of construction, they are T shaped in cross section, the top of the T being outward. This form gives lightness and strength, but better still, it gives a convenient handle on each side the burner, that will always be cool even should the flame "strike back" as sometimes happens. The uprights $f, f$, are joined at their tops the connection forming the holder for the mixing tube. Each side of the center this connection is flat with projecting a flange at the top, shown at $e$, this flange and flat part form a sort of recess in which rest the ends of the wire spring $d$. The central portion of this cross connection is curved to embrace the mixing tube, the curvature is of greater radius than that of the mixing tube, so that the surface of contact is small. This surface of contact is still further reduced by the projecting flanges $h, h$, above and below; this is best shown in Fig. 7. These flanges are connected by a thin web of metal, $h'$, Fig. 7, the web and flanges together making the central portion of the cross connection.

A modification of this top part of the casting is to have a V shaped groove within which the mixing tube rests, the tube touching top and bottom flanges similar to those just described. This is shown in Fig. 9.

The wire spring $d$ with its ends resting in the recesses at $e, e$, holds the mixing tube against the flanges $h, h;$ but as the flanges have a slightly larger radius of curvature than the tube, the surface actually in contact is very small, being similar to that of two circles tangent internally. The spring $d$ is made of spring brass similar to that used in making the springs that hold the chimney of an ordinary kerosene lamp; such brass holds its temper indefinitely when heated repeatedly. The spring $d$ yields sufficiently to permit the tube $c$ to be raised to allow more air to mix with the gas above the nipple $b$, or to permit of excluding the air entirely by pressing the tube against the base around the nipple.

The uprights $f, f$, have recesses $t, t$, on both sides of their upper ends; these recesses are adapted to receive the legs $o$, of the vessel support. This latter consists of a ring of cast iron $m$, from which radial fingers $n, n, n, n$, extend inward, and the legs $o, o$, extend downward. The fingers have a slight downward slope toward the center, so that a flat bottomed vessel touches them at but four points, one on each finger; the points of contact on the vessel being on the edge of the bottom so long as the vessel's diameter does not exceed that of the ring. The fingers are cast solid with the ring.

The legs $o$, of the support are made of sheet metal, beaded for strength, perhaps, and are riveted to the ring $m$. Extending upward from their lower ends are deep recesses or open slots $q, q$. The leg extensions $p, p$, each side of the slots, are adapted to enter the recesses $t, t$, on the uprights, the midribs of the uprights entering the open slots $q, q$. In this way the vessel support is detachably attached to the burner. Fig. 10 shows the burner with the support in place. It is evident that the support can not be used with any other burner.

While I have described the vessel support as having a cast iron ring with legs riveted on, I do not limit myself to that construction. The entire support can readily be stamped from sheet metal, with bosses to hold the vessel clear of the body of the ring.

I claim:

1. In a Bunsen burner, the combination of a circular base having a recess, and a conical inflexible gas admission tube immediately above the said recess, the lowest element of the conical surface of the said admission tube being parallel to the bottom of circular base.

2. In a gas burner the combination of a tube and a tube holding device, the said device consisting of a concavely curved part having a greater radius of curvature than the said tube, and a spring contacting the said tube opposite the said curved part.

3. In a gas burner the combination of a tube and a tube holding device, the said device consisting of a recessed part and a spring contacting the said tube opposite the said recessed part, the ends of said spring being held on opposite sides of said tube.

4. In a gas burner the combination of a tube and a tube holding device, said device consisting of a recessed part having flanges projecting inward at its extremities and a spring contacting said tube opposite said recessed part.

5. In a gas burner the combination of a tube and a tube holding device, the said device consisting of a recessed part having flanges projecting inward at its extremities, and a spring contacting said tube opposite said recessed part, said spring being held on opposite sides of said tube.

LARRANCE PAGE.

Witnesses:
E. T. FAIRCHILD,
R. R. PATTERSON.

Copies of this patent may be obtained for five cents each, by addressing the "Commissioner of Patents, Washington, D. C."